（12) United States Patent
Engle et al.

(10) Patent No.: US 6,591,857 B2
(45) Date of Patent: Jul. 15, 2003

(54) FUEL TANK VENTING SYSTEM

(75) Inventors: Brian Allen Engle, Armada, MI (US);
James Fuller Potter, Livonia, MI (US);
Harold Edward Cunningham, Oxford, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/997,736

(22) Filed: Nov. 29, 2001

(65) Prior Publication Data

US 2003/0098062 A1 May 29, 2003

(51) Int. Cl.[7] .............................................. F16K 24/04
(52) U.S. Cl. ........................................ 137/202; 137/587
(58) Field of Search ................................. 137/202, 587

(56) References Cited

U.S. PATENT DOCUMENTS

| | | | | |
|---|---|---|---|---|
| 4,960,153 A | * | 10/1990 | Bergsma | 137/587 |
| 4,966,189 A | * | 10/1990 | Harris | 137/587 |
| 5,605,175 A | | 2/1997 | Bergsma et al. | |
| 5,782,262 A | * | 7/1998 | Kim | 137/202 |
| 6,289,915 B1 | * | 9/2001 | Nulman et al. | 137/202 |
| 6,298,540 B1 | | 10/2001 | Benjey et al. | |
| 6,302,137 B1 | | 10/2001 | Devall | |
| 6,408,867 B2 | * | 6/2002 | Aoki et al. | 137/202 |

FOREIGN PATENT DOCUMENTS

| | | | | |
|---|---|---|---|---|
| EP | 1 124 083 A2 | | 8/2001 | |
| WO | WO 01/07806 A1 | * | 2/2001 | 137/202 |

\* cited by examiner

Primary Examiner—Gerald A. Michalsky
(74) Attorney, Agent, or Firm—Brinks Hofer Gilson & Lione

(57) ABSTRACT

A venting system for venting a gaseous fluid from a tank having an aperture and a fuel delivery module cover. The tank is made of a predetermined material. The venting system comprises a venting valve disposed within the aperture. The venting valve includes a valve body having a top portion and a neck portion extending from the top portion. The top portion is disposed outside the tank and is engaged thereto. The venting system further includes a channel which connects to the valve body so that the venting valve is in fluid communication therewith and is attached to the fuel delivery module cover to allow the gaseous fluid in the tank to be vented therefrom. The venting system further includes a cover which is comprised of the same predetermined material and is welded to the tank to seal the valve between the cover and the tank.

20 Claims, 3 Drawing Sheets

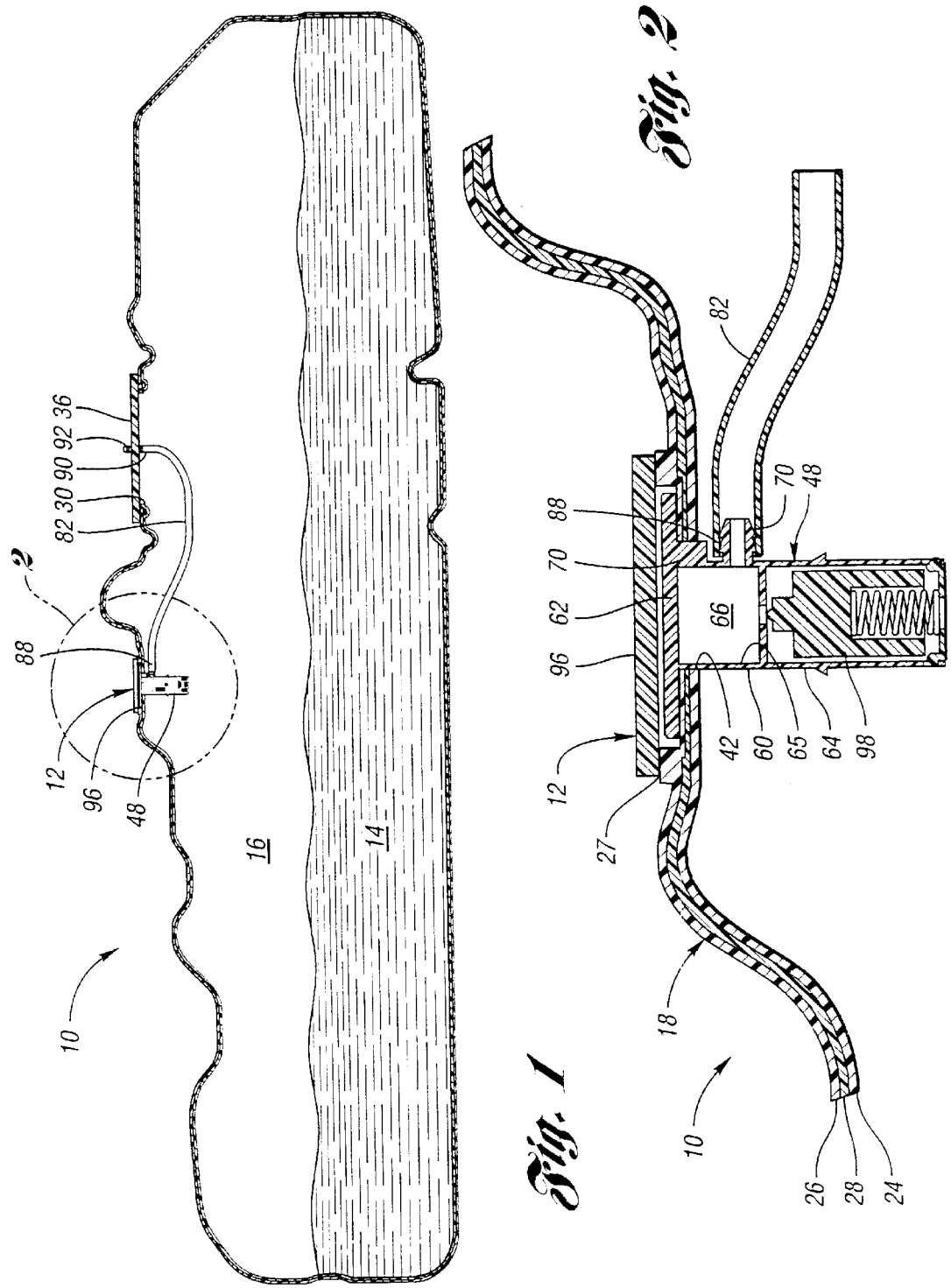

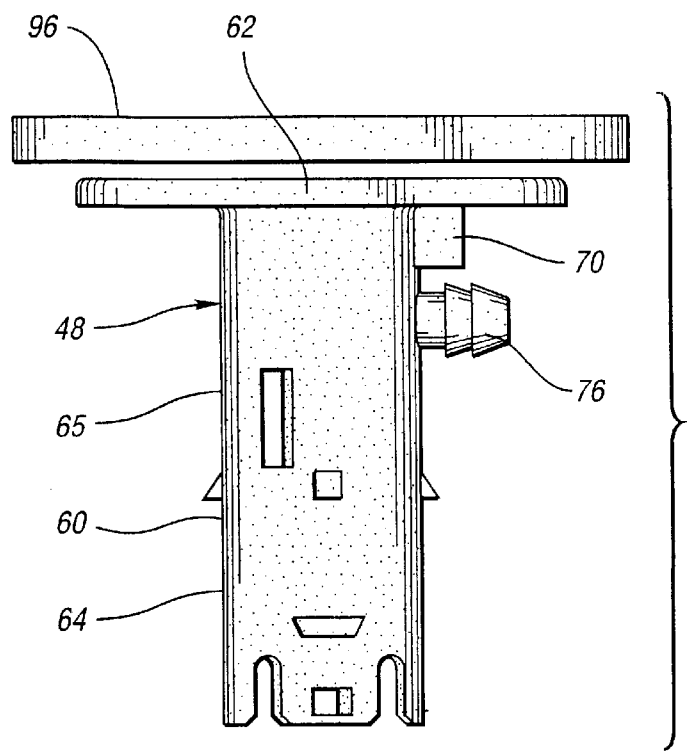
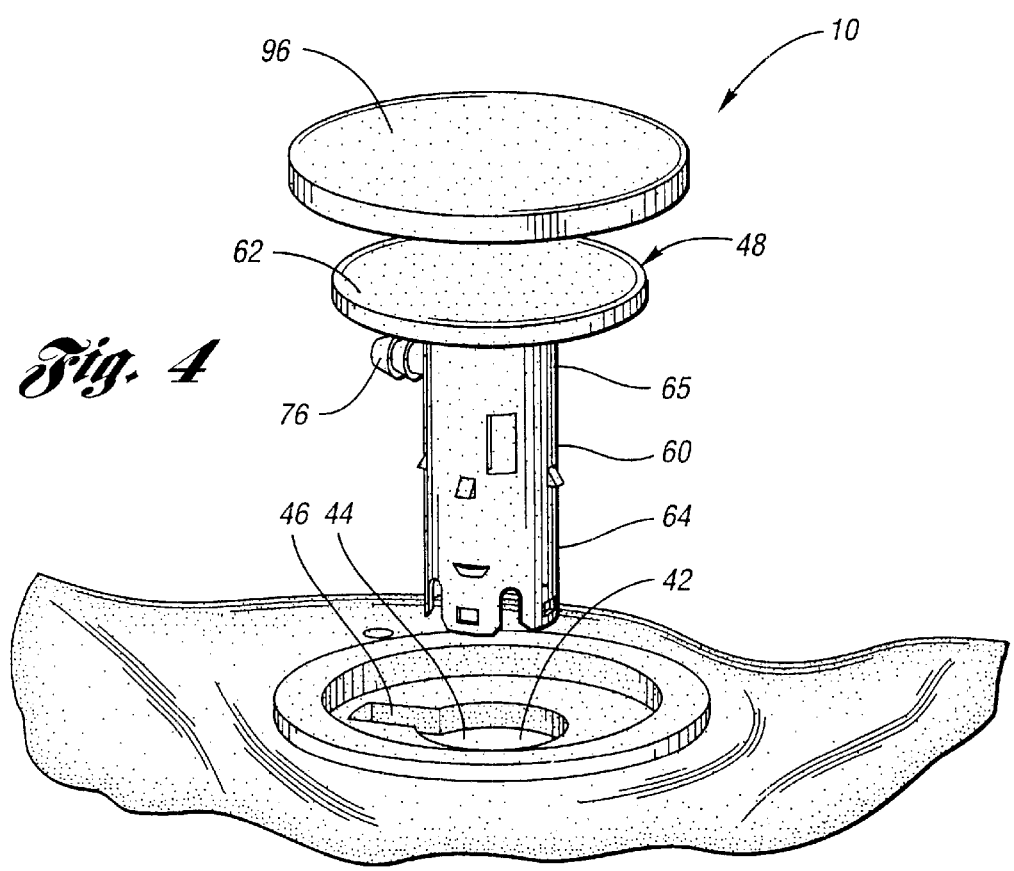

FUEL TANK VENTING SYSTEM

BACKGROUND OF THE INVENTION

The present invention relates to a fuel tank having a venting system for venting a gaseous fluid from a fuel tank.

Blow-molded fuel tanks are known and have been widely used in industries such as the automotive industry. Vapor valving is a common way of venting a gaseous fluid at a particular pressure from a blow-molded fuel tank containing liquid and gaseous contents. In many venting systems of blow-molded fuel tanks, a gaseous fluid is vented through a typical venting valve which is disposed within a surface or tank shell layer of the tank of a vehicle. The gaseous fluid flows through a connection port of the valve, wherein the port is located outside the tank during operation of the valve. The connection port is in fluid communication with a permeation barrier hose through which the gaseous fluid flows to be received in a separate vapor canister within the vehicle for further processing.

The above-mentioned system is adequate but can be improved. For instance, the venting valve, which typically is made of a different material than the tank shell layer, is welded to attach to the tank shell layer with a permeation barrier material, e.g., nylon. This creates a weld having two different coefficients of thermal expansion, wherein surface contact is typically continuously maintained. In many situations, this often results in delamination of the materials from each other.

In addition, the cost of such venting system is relatively high, since materials required to manufacture or purchase the permeation barrier hose is relatively expensive. Such permeation barrier hose may comprise a significant portion relative to the entire cost of manufacturing the venting system.

BRIEF DESCRIPTION OF THE DRAWINGS

FIG. 1 is a cross-sectional side view of a fuel tank having a venting system in accordance with one embodiment of the present invention;

FIG. 2 is an enlarged view of the venting system in circle 2 of FIG. 1 in accordance with one embodiment of the present invention;

FIG. 3 is a side view of a venting valve and a sealing cover of the venting system in FIG. 2;

FIG. 4 is a perspective environmental view of the venting valve depicted in FIG. 3;

Figure 5:
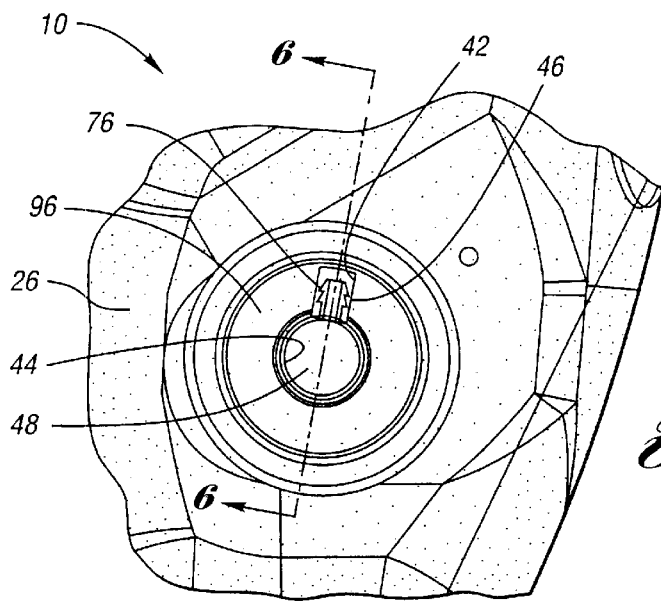
FIG. 5 is a partially broken-away top view of the fuel tank having the venting system.

Further objects, features and advantages of the invention will become apparent from consideration of the following description and the appended claims when taken in connection with the accompanying drawings.

DETAILED DESCRIPTION OF THE INVENTION

The present invention generally provides a venting system which reduces the risk of undesired exposure of a gaseous fluid to the atmosphere and eliminates a need of a costly permeation barrier hose typically used in vapor venting. The venting system provides a venting valve which is sealed by welding a cover to the tank with a permeation barrier material, wherein the tank and the cover are of the same materials. This reduces the sheer stresses in the permeation barrier material which, in turn, has been determined to reduce the risk of delamination thereof. The present invention further provides the valve being configured to internally vent gaseous fluids, reducing the amount of the costly permeation barrier hose needed outside the tank.

FIG. 1 illustrates a fuel tank 10 having a venting system or assembly 12 for venting a gaseous fluid from the tank 10. As shown, tank 10 includes venting assembly 12 for venting a gaseous fluid from the tank 10 containing liquid and gaseous fluids 14, 16. Liquid and gaseous fluids 14, 16 may be any fluid used in vehicle fuel tanks as known in the art, e.g., gasoline. As shown in FIG. 2, fuel tank 10 includes tank shell layer 18 having inner and outer layers 24, 26 and an ethylene vinyl alcohol (EVOH) layer 28 which is co-extruded between inner and outer layers 24, 26 preferably but not necessarily by a blow molding process. Inner and outer layers 24, 26 may be made of high density polyethylene. However, it is understood that the inner and outer layers of the tank shell layer may be made of any other suitable plastic material without falling beyond the scope or spirit of the present invention. Tank shell layer 18 further includes hole 30 formed therethrough and is configured so that fuel delivery module cover 36 may be removably inserted into hole 30 to attach to tank shell layer 18.

In this embodiment, fuel tank 10 is preferably but not necessarily a fuel tank for a vehicle. However, it is understood that the fuel tank mentioned in this embodiment of the present invention may include any size vehicle tanks, storage tanks, or any other suitable tank without falling beyond the scope or spirit of the present invention.

FIGS. 2 and 4 depict aperture 42 formed through tank shell layer 18. As shown, aperture 42 is defined by two portions. As shown in FIGS. 4 and 5, aperture 42 is defined by a circular portion 44 and a notch portion 46 formed through tank shell layer 18. In this embodiment, aperture 42 is formed through tank shell layer 18 in a shape of a typical keyhole. However, as described in greater detail below, aperture 42 may be formed of any other suitable shape.

FIGS. 2–4 and 6a illustrate venting valve 48 which is configured to insert through aperture 42 and to attach to fuel tank 10. Venting valve 48 includes valve body or housing 60 having top portion 62 and neck portions 64 extending from top portion 62. As shown, neck portion 64 includes a radial wall integrally extending from top portion 62 to define an inner space 66 in neck portion 64 in which spring and float assembly 96 is housed as discussed below. As shown, index 70 and port 76 extend from neck portion 64, wherein port 76 is disposed below index 70 relative to top portion 62. Neck portion 64 engages shell layer 18 in circle portion 44 and index 70 engages shell layer 18 in notch portion 46 to prevent movement of the valve 48 within aperture 42. As shown, neck portion 64 is configured to have dimensions or a shape complementing but slightly greater than circle portion 44. This allows neck portion 64 to be frictionally retained in circle portion 44. Index 70 is configured to have dimensions or a shape complementing but slightly greater than notch portion 46. This allows index 70 to be frictionally retained in notch portion 46. Index 70 is retained in notch portion 46 of aperture 42 so that venting valve 48 may be retained within aperture 42 without radial movement therewithin. Index 70 also allow only one way of installing the valve 48 onto the fuel tank 10.

As shown, port 76 is in fluid communication with inner space 66. Venting system 12 includes internal hose or channel 82 having first and second ends 88, 90, wherein first end 88 attaches to port 76 and second end 90 attaches to coupling 92 of fuel delivery module cover 36 so that port 76 is in fluid communication with coupling 92. In this embodiment, the gaseous fluid is vented to flow to a separate system, e.g., a vapor canister (not shown), within the vehicle for further processing. This allows channel 82 to be in fluid communication with venting valve 48 so that the gaseous fluid may be vented from tank 10 to the vapor canister separate from the tank.

In this embodiment, port 76 is shown to be disposed radially adjacent index 70; however, port 76 may be formed along neck portion 64 at any other suitable location. Additionally, it is understood that, although the port is shown to have a male nozzle or barbed configuration, the port may be configured to have any other connection without falling beyond the scope or spirit of the present invention. For example, the port may have a male quick connection fit and the internal hose may have a corresponding female quick connection fit.

Figure 6A:
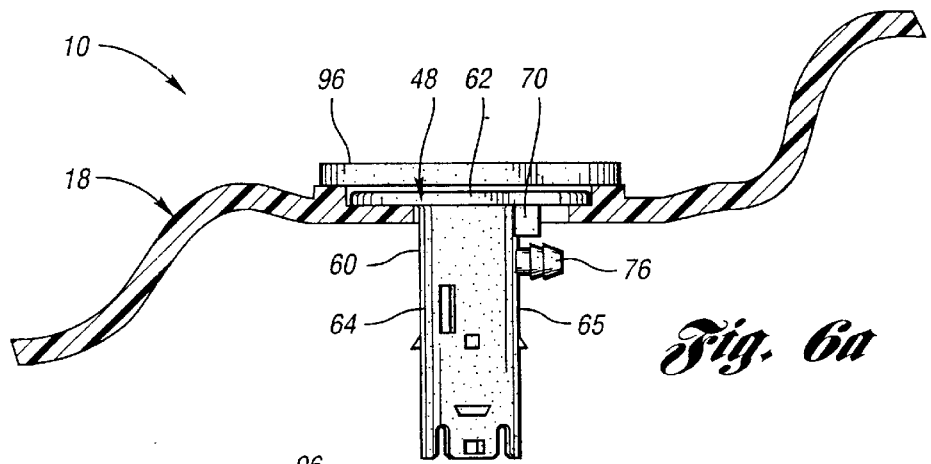
FIG. 6a is a side view of the venting system in FIG. 5.
Figure 6B:
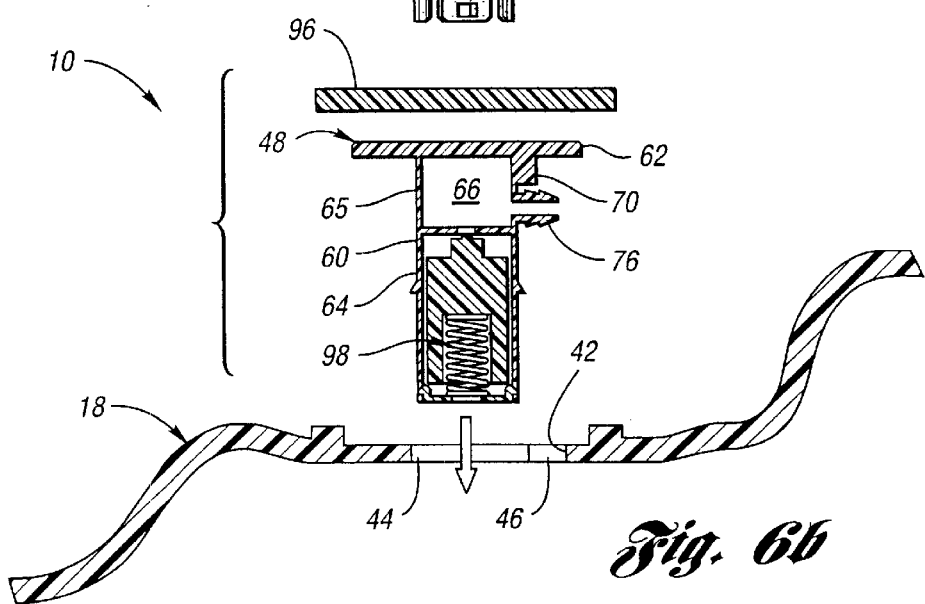
FIG. 6b is an exploded cross-sectional view of the venting system in FIG. 5 taken along lines 6—6.

As shown in FIGS. 2 and 6b, valve body 60 includes a typical spring and float assembly 98 housed within inner space 66. Spring and float assembly 98 allows venting valve 48 to vent gaseous fluids at a predetermined pressure, e.g., about 1.0 to 3.0 pounds per square inch gauge or about 30 to 60 inches water, without venting liquid fluid therefrom. In this embodiment, valve body 60 of venting valve 48 includes a spring and float assembly housed therein as a mechanism for allowing gaseous fluids to be vented. However, any other suitable mechanisms known in the art may be used to vent gaseous fluids from the fuel tank. For example, the valve body may include a grade venting, rollover, fill limit/vent, or shutoff mechanism. It is understood that, although a pressure range at which the valve vents the gaseous fluid has been discussed above, a more broad range may be used without falling beyond the scope or spirit of the present invention.

As shown in FIGS. 2 and 4, sealing cover 96 is mounted onto outer layer 26 of tank shell layer 18. Sealing cover 96 preferably but not necessarily has corresponding inner and outer layers made of the same material as inner and outer layers 24, 26 of tank shell layer 18 and has an EVOH layer disposed therebetween by blow molding. Thus, sealing cover 96 and tank shell layer 18 have substantially the same coefficients of thermal expansion. Sealing cover 96 may be attached to outer layer 26 by any suitable means. In this embodiment, cover 96 is welded onto outer layer 26 by a permeation barrier material 27 to seal top portion 62 of valve 48 between outer layer 26 and cover 96. The permeation barrier material may be nylon. As shown, the valve of this embodiment of the present invention is separate from the sealing cover which is welded onto the outer layer. Thus, the valve is not required to be in continuous surface contact with the cover, although the cover may merely engage the top portion of the valve.

While the present invention has been described in terms of preferred embodiments, it will be understood, of course, that the invention is not limited thereto since modifications may be made to those skilled in the art, particularly in light of the foregoing teachings.

What is claimed is:

1. A fuel tank having a venting system, the fuel tank comprising:
    a fuel tank including a tank shell layer having inner and outer layers, the tank shell layer including a fuel delivery module cover disposed thereon and an aperture formed therethrough, the tank shell layer comprising a predetermined material;
    a venting valve for venting a gaseous fluid at a predetermined pressure from the tank, the valve being disposed through the aperture, the venting valve including a valve body having a top portion and a neck portion integrally extending from the top portion, the top portion engaging the outer layer to suspend the venting valve in the tank, the neck portion having an index and a port extending from the neck portion, the index engaging the tank shell layer to prevent movement of the valve, the port being in fluid communication with the valve when the valve vents gaseous fluid;
    a channel having first and second ends, the first end connecting to the port within the tank so that the venting valve is in fluid communication therewith when the valve vents gaseous fluid, the second end being attached to the fuel delivery module cover to allow gaseous fluid in the tank to be vented therefrom; and
    a cover comprising the predetermined material and attached to the outer layer to seal the valve between the cover and the outer layer.

2. The fuel tank of claim 1 further comprising a permeation barrier material welded between the cover and the outer layer of the tank shell layer.

3. The fuel tank of claim 2 wherein the outer layer and the cover have substantially the same coefficients of expansion.

4. The fuel tank of claim 2 wherein the permeation barrier material is nylon.

5. The fuel tank of claim 1 wherein the aperture is defined by first and second portions, the neck portion of the valve body engaging the tank shell layer in the first portion and the index engaging the tank shell layer in the second portion of the aperture to prevent movement of the valve within the aperture.

6. The tank of claim 5 wherein the first portion is a circular portion and the second portion is a notch portion, the neck portion being configured to have dimensions complementing the circle portion and the index being configured to have dimensions complementing the notch portion.

7. The tank of claim 1 wherein the port is a male nozzle and the channel is a tube having a female end disposed about the port.

8. The tank of claim 1 wherein the port is a quick connect end and the channel is a corresponding quick connect end attaching to the port.

9. The tank of claim 1 wherein the inner and outer layers of tank shell layer are made of a high density thermoplastic.

10. The tank of claim 1 wherein the tank shell layer further includes a middle barrier layer disposed between the inner and outer layers.

11. A venting system for venting a gaseous fluid from a tank having an aperture and a fuel delivery module cover, the tank being of a predetermined material, the venting system comprising:
    a venting valve disposed within the aperture, the venting valve including a valve body having a top portion and a neck portion integrally extending from the top portion, the top portion disposed outside the tank and engaged thereto, the neck portion disposed in the tank and having an index and a port extending from the neck portion, the port formed below the index relative to the top portion, the port being in fluid communication with the valve when the valve vents the gaseous fluid;
    a channel having first and second ends, the first end connecting to the port within the tank so that the venting valve is in fluid communication therewith when the valve vents the gaseous fluid, the second end being attached to the fuel delivery module cover to allow the gaseous fluid in the tank to be vented therefrom; and a cover comprised of the predetermined material and welded to the tank to seal the valve between the cover and the tank, the cover having the same coefficient of expansion as the tank.

12. The system of claim 11 further comprising a permeation barrier material welded between the cover and the tank.

13. The system of claim 12 wherein the permeation barrier material is nylon.

14. The system of claim 11 wherein the aperture is defined by first and second portions, the neck portion of the valve body engaging the tank in the first portion and the index engaging the tank in the second portion of the aperture to prevent movement of the valve within the aperture.

15. The system of claim 14 wherein the first portion is a circular portion and the second portion is a notch portion, the neck portion being configured to have dimensions complementing the circle portion and the index being configured to have dimensions complementing the notch portion.

16. The system of claim 11 wherein the port is a male nozzle and the channel is a tube having a female end disposed about the port.

17. The system of claim 11 wherein the port is a quick connect end and the channel is a corresponding quick connect end attaching to the port.

18. The system of claim 11 wherein the tank is made of a high density thermoplastic.

19. The system of claim 11 wherein the tank includes a middle barrier layer disposed between inner and outer layers of the tank.

20. A venting valve of a venting system for venting a gaseous fluid from a tank, the venting valve comprising:

a valve body having a top portion and a neck portion integrally extending from the top portion, the top portion being configured to be disposed outside the tank and the neck portion being configured to be disposed inside the tank; the neck portion having an index and a port extending from the neck portion, the port formed below the index relative to the top portion, the port being in fluid communication with the valve when the valve vents the gaseous fluid.

* * * * *